(12) United States Patent
Carter

(10) Patent No.: US 8,438,004 B2
(45) Date of Patent: May 7, 2013

(54) SYSTEM AND METHODS FOR LANGUAGE TRANSLATION PRINTING

(75) Inventor: Bryan Keith Carter, Meridian, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 3031 days.

(21) Appl. No.: 09/971,804

(22) Filed: Oct. 3, 2001

(65) Prior Publication Data

US 2003/0065499 A1    Apr. 3, 2003

(51) Int. Cl.
*G06F 17/27* (2006.01)
*G06F 17/28* (2006.01)

(52) U.S. Cl.
USPC .................... 704/2; 704/3; 704/8; 704/9

(58) Field of Classification Search ........... 704/8, 200.1, 704/2–7, 9; 382/174
See application file for complete search history.

(56) References Cited

U.S. PATENT DOCUMENTS

| | | | | |
|---|---|---|---|---|
| 5,175,684 A * | 12/1992 | Chong | ............................... | 704/3 |
| 5,321,607 A * | 6/1994 | Fukumochi et al. | ............... | 704/4 |
| 5,329,446 A * | 7/1994 | Kugimiya et al. | ................ | 704/4 |
| 5,497,319 A * | 3/1996 | Chong et al. | ...................... | 704/2 |
| 5,727,082 A * | 3/1998 | Sugishima | ..................... | 382/229 |
| 5,745,596 A * | 4/1998 | Jefferson | ....................... | 382/176 |
| 5,797,011 A * | 8/1998 | Kroll et al. | ..................... | 717/137 |
| 5,812,818 A * | 9/1998 | Adler et al. | ...................... | 703/23 |
| 5,848,386 A * | 12/1998 | Motoyama | ......................... | 704/5 |
| 6,067,510 A * | 5/2000 | Kimura et al. | ..................... | 704/7 |
| 6,201,894 B1 * | 3/2001 | Saito | ............................. | 382/176 |
| 6,429,950 B1 * | 8/2002 | Ebner | ............................ | 358/1.9 |
| 6,473,728 B1 * | 10/2002 | Tognazzini | ....................... | 704/3 |
| 6,539,116 B2 * | 3/2003 | Takaoka | ......................... | 382/229 |
| 6,738,535 B2 * | 5/2004 | Kanevsky et al. | ............. | 382/312 |
| 2001/0029455 A1 * | 10/2001 | Chin et al. | ..................... | 704/277 |

* cited by examiner

*Primary Examiner* — Pierre-Louis Desir
*Assistant Examiner* — Abdelali Serrou

(57) ABSTRACT

An imaging device is configured to translate text in an imaging job (e.g., a print job) from one language to another. The imaging job is received from an input device and can be processed upon receipt or stored on the imaging device for later processing. A variable data language translation module distinguishes textual data from graphical data within the imaging job and performs language translation only on the textual data. Performing language translation at the imaging device rather than at the input device permits the shared use of the language translation module between multiple users who already share the imaging device and reduces the need for language translation imaging software on individual personal computers.

13 Claims, 2 Drawing Sheets

SYSTEM AND METHODS FOR LANGUAGE TRANSLATION PRINTING

TECHNICAL FIELD

The present invention relates to language translation, and more particularly, to printing a document in a language that is different from the language in which the document was received or stored.

BACKGROUND

Current methods and systems for translating text from one language to another include the use of a stand-alone personal computer (PC) executing language translation software. A computer user can enter text in English, for example, and have the text translated into any language made available by the particular translation software executing on the computer. In addition, there are network based language translation systems that translate text from one language to another. For example, numerous Web sites are available that allow a user to enter words or groups of words in one language and then select a target language into which the words will be translated.

The same general methods and systems apply when a user wants to print a document having text in one language as a document where the text is in a different language. An example of this might be an American employee of a multinational corporation wanting to print a copy of a presentation prepared in Japanese by a colleague in the Tokyo office. The text must first be separated from the document while leaving any graphical components intact. The text is then entered into an available language translation system (e.g., on a PC or network) where it is translated into another language. The translated text is then reinserted into the document and the document is printed.

There are several disadvantages with this method of language translation printing. The first involves the use of stand-alone PC's executing language translation software and applies not only to language translation printing but to language translation in general. For businesses whose employees require language translation capability, providing language translation software for each employee's computer can be quite expensive. Maintaining the software on each computer with periodic upgrades creates additional and ongoing financial burdens not only in software costs, but also in the time required for such maintenance.

Other problems associated with the use of stand-alone PC's for language translation include a burden placed on PC's with limited resources for storing and executing the software. The ability to store and process other important applications on a limited purpose PC may be impaired by an employee's need to execute language translation software. Finally, web-based translation services require a connection to the internet in order to access the translation service.

The use of network based language translation systems can alleviate some of the costs associated with the need to provide multiple users with language translation printing. In addition, network based systems remove the burden from PC's of the added storage and processing capability required for implementing language translation software. However, the main disadvantage associated with both PC and network or web-based translation systems remains. The manual task of extracting text from a document having graphical and textual content, entering the text into a language translation system, and then reinserting the translated text back into the document so that the document can be printed in a different language is very tedious and time consuming.

Accordingly, the need exists for a way to provide language translation printing for multiple users that does not require expensive software and additional computing resources for each user, and that automatically separates text from graphics in a document, translates the text into a different language, and prints the document with the translated text.

SUMMARY

An imaging device is configured to perform language translation imaging. An imaging job is received from an input device and can be processed upon receipt or stored on the imaging device for later processing. A variable data language translation (VDLT) module on the imaging device distinguishes variable data from fixed data within the imaging job. The VDLT module processes the variable data as text, translating it from its current language into a new language. The module does not attempt to translate the fixed (i.e., graphical) data from the imaging job. An image is formed from the imaging job that includes the new variable data and the fixed data.

The VDLT module is configured to distinguish variable data (i.e., text) within an imaging job in two ways. First, if an input device has variable data imaging intelligence it can insert data tags into the imaging job prior to sending the job to the imaging device. The VDLT module is configured to distinguish variable data by recognizing the data tags that identify the variable data. However, if the VDLT module discovers that variable data tags are not present in the imaging job sent by the input device, the module parses through all of the data in the job and sets off the variable data from the fixed data so that it can translate just the variable data.

BRIEF DESCRIPTION OF THE DRAWINGS

The same reference numbers are used throughout the drawings to reference like components and features.

DETAILED DESCRIPTION

The system and methods described herein relate to language translation printing/imaging. An imaging device such as a printer is configured to translate the text within a print job from one language to another language and to output the print job with the text in the new language. Text recognition and language translation are performed at the imaging device. Performing language translation at the imaging device rather than at the image input device permits the shared use of the language translation software between multiple users who already share the imaging device. This lowers costs in multi-user environments by reducing the need to provide language translation software on individual personal computers or subscriptions to language translation services.

For purposes of this description, the terms "document" and "image" are generally used interchangeably. Likewise, the phrases "print job" and "image job" are generally used interchangeably throughout this description and typically describe a document or image that is in various stages of processing prior to being formed as a hard copy image or document on a print medium.

Exemplary System for Language Translation Imaging/Printing

Figure 1:
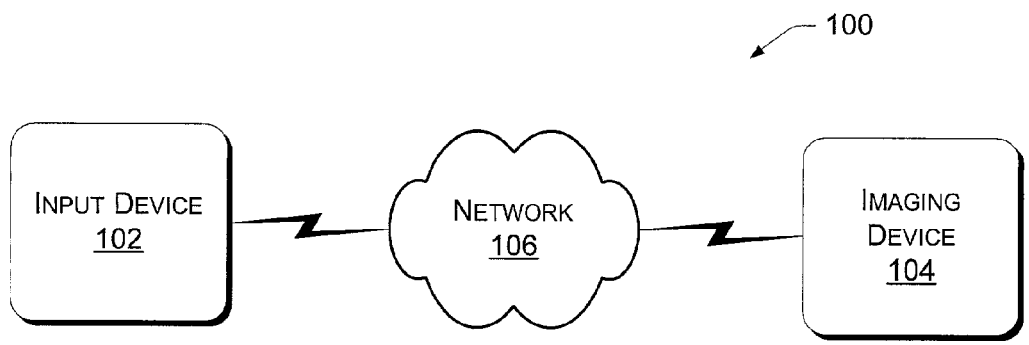
FIG. 1 illustrates an imaging device in a system environment suitable for providing language translation imaging.

FIG. 1 illustrates an example of a system environment 100 suitable for providing language translation printing. The system 100 includes an image input device 102, an image forming device 104, and a communication network 106 operatively coupling the input device 102 to the imaging device 104. Network 106 can include, for example, a printer cable, a LAN (local area network), a WAN (wide area networks), an intranet, the Internet, or any other suitable communication link.

Input device 102 can be implemented as a variety of general purpose and special purpose devices. Examples of general purpose input devices 102 include a personal computer (PC), a server, a Web server, and other devices configured to communicate with an imaging device 104. Examples of special purpose input devices 102 include other imaging devices such as a facsimile machine or a scanner. In general, input device 102 provides a user with the ability to manipulate or otherwise prepare in electronic form, an image or document to be rendered as an image that is printed or otherwise formed onto a print medium by imaging device 104 after transmission over network 106.

Imaging device 104 is often a device that is peripheral to a general purpose input device 102 such as described above, but it can also be a stand-alone device coupled to general and special purpose input devices 102 through network 106. One exemplary imaging device 104 includes a printer, such as a laser printer, an inkjet printer, a dot matrix printer, a dry medium printer, a plotter and the like. Other examples of imaging devices 104 include facsimile machines, copiers, scanners and multifunction peripheral (MFP) devices which combine the functionality of two or more peripheral devices into a single device.

In general, imaging device 104 receives an image as an image job transmitted by an input device 102 over network 106. Imaging device 104 is configured to render the image as a hard copy image document formed on various print media including, for example, paper, transparencies, glossy photo paper, envelopes, labels and the like. Prior to rendering the image onto print media, imaging device 104 may process the image job to effect various outcomes in the formed image. For example, image device 104 may apply language translation processing that results in the depiction of text in a language that is different from the language in which the text was configured when the image job was received. Such language translation processing is discussed in greater detail below.

Exemplary Embodiment of a System for Language Translation Printing/Imaging

Figure 2:
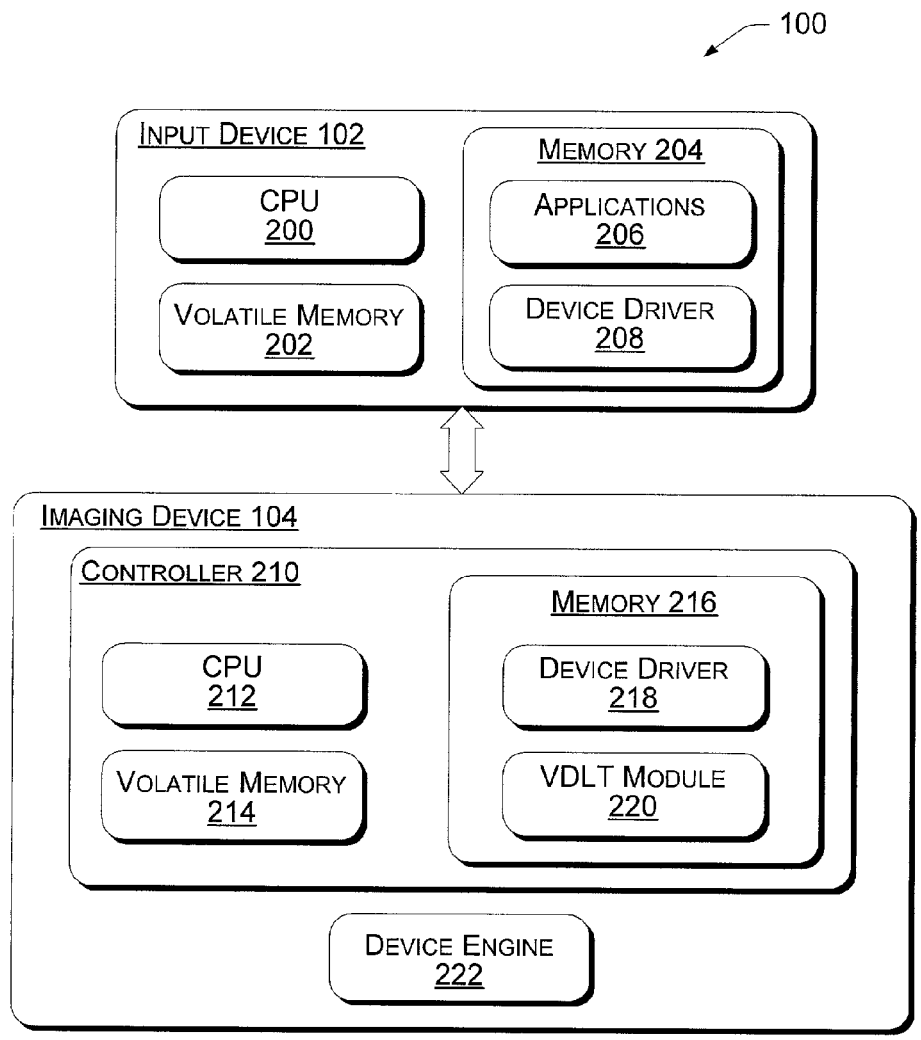
FIG. 2 is a block diagram illustrating an imaging device coupled to an input device in a system environment such as that shown in FIG. 1.

FIG. 2 illustrates an exemplary embodiment of system 100 of FIG. 1 in greater detail. Image input device 102 is embodied as a host computer operatively coupled to imaging device 104. The host computer input device 102 includes a data processing unit or CPU 200, a volatile memory 202 (i.e., RAM), and a non-volatile memory 204 (e.g., ROM, hard disk, floppy disk, CD-ROM, etc.). Nonvolatile memory 204 generally provides storage of computer readable instructions, data structures, program modules and other data for input device 102.

As a general host computer, imaging input device 102 may implement various application programs 206 stored in memory 204 and executed on processor 200 that create a document or image (text and graphics) on a computer screen that is transferred to imaging device 104 for creating a hard copy of the document/image. Such applications 206 might include software programs implementing word processors, illustrators, computer-aided design tools and the like. Input device 102 may also implement one or more software-based device drivers 208 stored in nonvolatile memory 204 and executed on processor 200 to format document data into page description language (PDL) such as PostScript or printer control language (PCL) or another appropriate format and output the formatted data to imaging device 104. Although device drivers 208 are typically implemented on a host device such as input device 102, they can also be implemented on the specific device they are "driving", such as discussed below with respect to imaging device 104.

In the FIG. 2 example embodiment of system 100, imaging device 104 is embodied as a printer device. Imaging/printer device 104 includes a controller 210 for processing input device 102 data. The controller 210 typically includes a data processing unit or CPU 212, a volatile memory 214 (i.e., RAM), and a nonvolatile memory 216. Nonvolatile memory 216 can include various computer storage media such as ROM, flash memory, a hard disk, a removable floppy disk, a removable optical disk and the like. Nonvolatile memory 216 generally provides storage of computer readable instructions, data structures, program modules and other data for imaging device 104. The program modules stored in memory 216 and executed on CPU(s) 212 include a device driver module 218 and a variable data language translation (VDLT) module 220, the characteristics of which will be explained in more detail in the following discussion.

Imaging device 104 also includes a device engine 222 (i.e., print engine) that performs the actual printing of a document or forming of an image onto a print medium. The imaging device controller 210 generally processes image/document data from input device 102 and manages imaging device 104 functions by controlling device engine 222.

In general, the variable data language translation (VDLT) module 220 is configured to provide language translation of text that is part of a print job received by imaging device 104 from input device 102. Alternatively, the print job can be a print job stored in memory 216 on imaging device 104 that has been previously received from input device 102. As mentioned above, a device driver 208 on input device 102 configures print job data into an appropriate format (e.g., PCL, postscript, etc.) for imaging device 104. However, this formatting can also be performed by the device driver 218 on imaging device 104. Either way, VDLT module 220 is configured to operate on the print job in, for example, a postscript language form.

Prior to translating text from one language to another language, VDLT module 220 first determines which part of the print job is text. Locating text within the print job includes distinguishing the text from graphics and other control parameters that are typically part of the print job. VDLT module 220 utilizes concepts known from "variable data printing" (VDP) technology to distinguish text within print jobs or image jobs.

A page description language (PDL) such as printer control language (PCL) or PostScript defines pages of a document as containing various data areas, where each data area contains either graphic or alpha-numeric data. In addition, each data area is defined by a collection of parameters that control the representation and appearance of text and graphics. For example, the parameters can include a set of text attributes such as scale factor, type font, and the like.

In general, variable data printing (VDP) provides high-speed printing based on the idea that all the data on each page of a document does not need to be processed. Where certain data such as a graphics background, for example, remains the same from page to page, VDP utilizes variously marked or tagged data to determine if the data is variable (e.g., text) or fixed (e.g., graphics). VDP "intelligent" printing devices include drivers that can insert such data tags, making recognition of various types of data easy for the printing device. Thus, a VDP device will process fixed data only one time while it processes variable data continuously. Because graphics require large amounts of data compared to text, VDP techniques can reduce data transfer and printing times dramatically.

Thus, the VDLT module 220 is configured to recognize data tags that have been inserted into print jobs to identify variable data that is text. The VDLT module 220 can therefore quickly separate the text from other variable data and/or fixed graphics data and control parameter data. However, when an imaging device 104 receives a print job that does not have data tags that identify variable data as text, the VDLT module 220 parses through all the data within the print job and differentiates textual data from other data such as graphical data and control parameter data.

The VDLT module 220 is additionally configured with a language translation component that can translate the text from its current language into a different language. The language translation component may be configured with the ability to translate between just two different languages or between many different languages. The translated text is reinserted where it belongs in the print job prior to printing the job as a hard copy document.

Previously specified control parameters determine the language into which the text is translated. Depending on the configuration of system 100, the parameters might be entered into the print job at the input device 102 or they may be set on the imaging device 104. For example, a French speaking user of a facsimile imaging device 104 in France who receives documents from various other parts of the world might set his/her device 104 to automatically translate incoming document text into French prior to imaging the document. As another example, a German citizen working in an American office may prefer to read work-related documents distributed through company email in his/her native German language. Via an application program 206 and/or device driver 208 executing on an input device 102, a language control parameter can be set such that an imaging device 104 (e.g., a printer) will output the documents with German text.

Exemplary Method for Language Translation Printing/Imaging

An example method for language translation printing will now be described with primary reference to FIG. 3. The method applies generally to imaging devices 104 as described above with respect to FIGS. 1 and 2.

Figure 3:
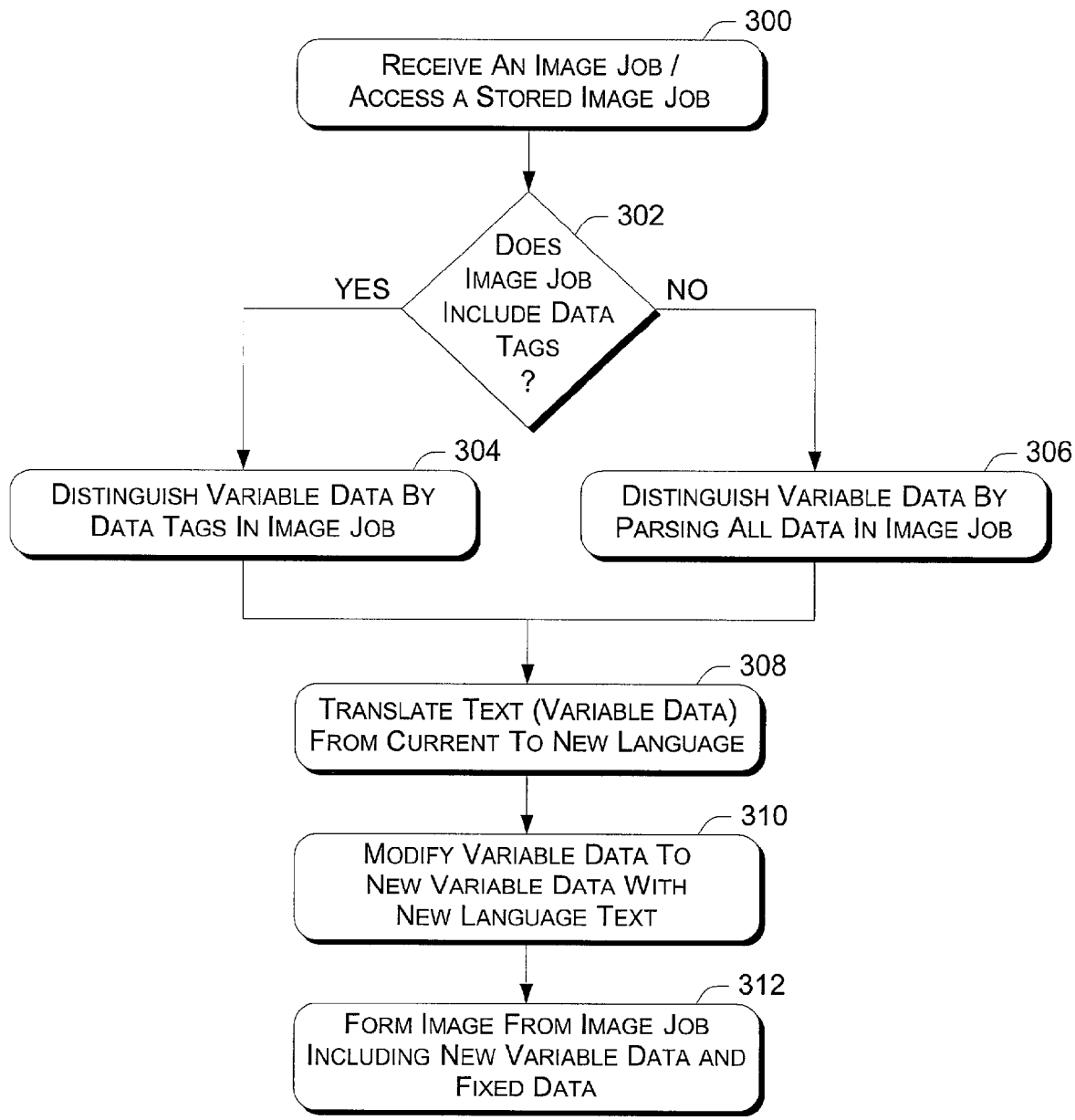
FIG. 3 is a flow diagram illustrating an example method of language translation imaging.

FIG. 3 is a flow diagram that shows an example of a general method for language translation printing on an imaging device 104. At block 300, an image job is received from an input device 102. Alternatively, the image job can be accessed from memory 216 of imaging device 104. At block 302, the imaging device determines whether the image job includes data tags. If the image job contains data tags, the imaging device 104 distinguishes variable data within the image job as text at block 304. If the image job does not contain data tags, the imaging device 104 distinguishes variable data as text by parsing through all the data in the image job at block 306.

After the imaging device 104 distinguishes the text within the image job, it translates the text from its current language into a new language at block 308. The new language is determined by a control parameter that is part of the data within the image job or that is set at the imaging device 104. The variable data within the image job is then modified to represent the text in the new language at block 310, and the image job is formed as a hard copy image on a print medium at block 312. The hard copy image includes any graphical images, typically represented as fixed data in the image job, and the text in its new language, represented by the new variable data in the image job.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of language translation imaging comprising:
receiving an image job;
distinguishing variable data that is current language text from any other variable data and fixed data within the image job, wherein the distinguishing includes recognizing data tags inserted into the image job prior to the receiving, the data tags identifying the variable data that is current language text;
translating the current language text into new language text;
modifying the variable data that is current language text to new variable data that is new language text; and
printing an image from the image job, wherein the image job comprises the new language text.

2. A method of language translation imaging comprising:
receiving an image job;
distinguishing variable data that is current language text from any other variable data and fixed data within the image job, wherein the distinguishing includes parsing all data within the image job to differentiate the variable data that is current language text from any other variable data and the fixed data;
translating the current language text into new language text;
modifying the variable data that is current language text to new variable data that is new language text; and
printing an image from the image job, wherein the image job comprises the new language text.

3. A method as recited in claim 1, wherein receiving an image job comprises accessing a previously stored image job.

4. A method as recited in claim 1, further comprising:
determining a language for the new language text from a configuration parameter within the image job.

5. A method as recited in claim 1, wherein the image job is a print job and the forming an image is printing the print job on a printing device.

6. A non-transitory computer-readable medium storing computer executable instructions configured to cause a computer to perform the method of claim 1.

7. A method of language translation printing comprising:
a printer distinguishing text within a print job, the text being current language text, wherein distinguishing includes recognizing data tags inserted into the print job, the data tags identifying the current language text or distinguishing includes parsing all data within the print job to differentiate the current language text from fixed data in the print job;
the printer translating the current language text into new language text;
the printer printing the print job with the new language text.

8. An imaging device to form images on print media, the imaging device comprising:
memory for storing an image job;

a language translation module configured to distinguish text within the image job and translate the text from a first language into a second language wherein the language translation module is operable to distinguish by recognizing data tags inserted into the image job, the data tags identifying the current language text or by parsing all data within the image job to differentiate the current language text from fixed data in the print job;

a device engine; and a controller configured to control the device engine to form an image from the image job onto a print medium, the image comprising the text in the second language.

9. An imaging device as recited in claim 8, wherein the image job comprises a parameter control variable configured to define the second language.

10. An imaging device as recited in claim 8 embodied as a device selected from:
   a printer;
   a scanner;
   a copier;
   a facsimile machine; and
   a multifunction peripheral device.

11. A printer comprising:
   memory of storing a print job; and
   a language translation module configured to distinguish text within the print job and translate the text from a first language into a second language, wherein the language translation module is operable to distinguish by recognizing data tags inserted into the print job, the data tags identifying the current language text or by parsing all data within the print job to differentiate the current language text from fixed data in the print job.

12. A printer as recited in claim 11, further comprising:
   a print engine; and
   a controller configured to control the print engine for printing the print job as a printed document, the printed document comprising the text in the second language.

13. A system for language translation imaging comprising:
   an input device to provide an image job;
   an imaging device to distinguish first language text from fixed data within the image job, translate the first language text into second language text, and form an image of the document on a print medium, the image comprising the second language text, wherein the imaging device is operable to distinguish by recognizing data tags inserted into the document, the data tags identifying the first language text or by parsing all data within the document to differentiate the first language text from fixed data in the document.

\* \* \* \* \*